US009210740B2

(12) United States Patent
Libman et al.

(10) Patent No.: US 9,210,740 B2
(45) Date of Patent: Dec. 8, 2015

(54) APPARATUS AND METHOD FOR IMPROVING EFFICIENCY OF RF HEATING

(71) Applicant: Goji Limited, Hamilton (BM)

(72) Inventors: Avner Libman, Holon (IL); Shamay Kardash, Rishon Le Zion (IL)

(73) Assignee: GOJI LIMITED, Hamilton (BM)

( * ) Notice: Subject to any disclaimer, the term of this patent is extended or adjusted under 35 U.S.C. 154(b) by 348 days.

(21) Appl. No.: 13/762,769

(22) Filed: Feb. 8, 2013

(65) Prior Publication Data

US 2013/0206749 A1 Aug. 15, 2013

Related U.S. Application Data

(60) Provisional application No. 61/597,466, filed on Feb. 10, 2012.

(51) Int. Cl.
*H05B 3/10* (2006.01)
*H05B 6/00* (2006.01)
*H05B 6/68* (2006.01)
*H05B 6/70* (2006.01)

(52) U.S. Cl.
CPC .................. *H05B 6/00* (2013.01); *H05B 6/686* (2013.01); *H05B 6/70* (2013.01); *Y02B 40/143* (2013.01)

(58) Field of Classification Search
CPC ............ H05B 6/00; H05B 6/686; H05B 6/70; H05B 6/705; H05B 6/6441; H05B 6/688; H05B 6/6447; H05B 6/6435; H05B 6/6455; H05B 6/72; H05B 6/6402; H05B 6/80; H05B 6/6408; H05B 6/76; Y02B 40/143; G01N 22/00; G01N 27/00; G01N 27/04; B65D 81/3446; G06F 15/00; B09C 1/06
See application file for complete search history.

(56) References Cited

U.S. PATENT DOCUMENTS

| 4,323,746 A | 4/1982 | Gerling |
| 2004/0004074 A1 | 1/2004 | Torngren et al. |
| 2011/0108548 A1 | 5/2011 | Nobue et al. |
| 2012/0164022 A1* | 6/2012 | Muginstein et al. ............ 422/22 |

* cited by examiner

*Primary Examiner* — Shawntina Fuqua
(74) *Attorney, Agent, or Firm* — Finnegan, Henderson, Farabow, Garrett & Dunner LLP

(57) ABSTRACT

An apparatus for applying RF energy to an energy application zone is disclosed. The apparatus may include: a set of receiving radiating elements, including at least first and second radiating elements sequentially interconnected. The sequential interconnection may be such that energy received by one of the receiving radiating element from the energy application zone is emitted back to the energy application zone by the next radiating element in the sequence and energy received by the last radiating element in the sequence from the energy application zone is emitted back to the energy application zone by the first radiating element in the sequence.

14 Claims, 8 Drawing Sheets

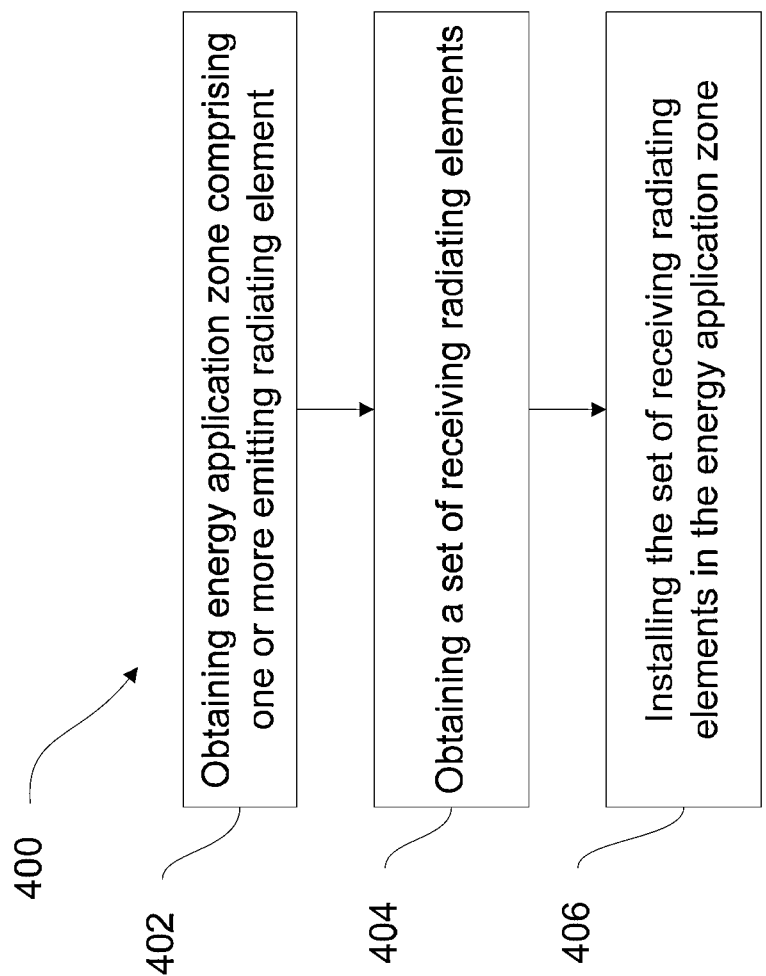

APPARATUS AND METHOD FOR IMPROVING EFFICIENCY OF RF HEATING

RELATED APPLICATION

The present application claims priority to U.S. Provisional Patent Application No. 61/597,466, filed on Feb. 10, 2012, which is fully incorporated herein by reference.

TECHNICAL FIELD

This is a U.S. patent application relating to a device and method for applying RF energy, and more particularly but not exclusively to a device and method for improving the energetic efficiency of RF ovens.

BACKGROUND

Electromagnetic waves have been used in various applications to supply energy to objects. In the case of radio frequency (RF) radiation for example, RF energy may be supplied using a magnetron, which is typically tuned to a single frequency for supplying RF energy only in that frequency. One example of a commonly used device for supplying RF energy is a microwave oven. Typical microwave ovens supply RF energy at or about a single frequency of 2.45 GHz.

When RF energy is supplied to an antenna to be delivered to an object (e.g., an object placed in a cavity), usually only a portion of the supplied energy is dissipated in the object or delivered to the cavity. Part of the energy may be reflected back from the cavity to the antenna. If more than one antenna is located in the cavity, part of the energy emitted from one antenna may be coupled to the other antenna(s).

SUMMARY

Some exemplary aspects of the disclosure include applying RF energy to an object placed in an energy application zone, and re-applying to the zone RF energy that was delivered to the zone, but was not dissipated in the zone. RF energy may be dissipated in the energy application zone, for example, by being dissipated in the object, by a tray supporting the object, by racks or other objects in the energy application zone, by walls defining the energy application zone, etc. The delivered energy may be emitted to the energy application zone from an emitting radiating element (e.g., an antenna). A portion of the delivered energy may be dissipated in the energy application zone, while another portion of the energy, referred to herein as coupled RF energy, may be coupled to one or more receiving radiating elements. The coupled RF energy or part thereof may be emitted back to the energy application zone by the receiving radiating elements. For example, a first and second radiating elements may be interconnected such that energy received by the first receiving radiating element can be emitted back into the zone by the second receiving radiating element, and vice versa. It is noted that although the above-discussed radiating elements are referred to as receiving radiating elements, they may be configured to both receive and emit RF energy. Two radiating elements interconnected such that energy received by a first radiating element, e.g., from an energy application zone, may be emitted back by a second radiating element to where the energy came from (e.g., to the energy application zone), and vice versa, may be referred to herein as being circularly or sequentially interconnected, and the connection between them may be termed circular interconnection. In some embodiments, radiating elements may be circularly interconnected simply by one or more cables arranged such that each of the radiating elements may feed at least one other radiating element. In some embodiments, radiating elements may be circularly interconnected such that substantially all the energy received by one radiating element may be emitted back by at least one of the other radiating elements. This may be achieved, for example, by using couplers. In some embodiments, the circulators may prevent energy received by a radiating element from being emitted back by the same radiating element. In some embodiments, circular interconnection may be achieved by using isolators and/or circulators, which may be arranged such that substantially all the energy received from the energy application zone by one of the radiating elements is emitted back to the energy application zone by at least one of the other radiating elements. An exemplary arrangement is shown in FIG. 1A. It is noted that the configuration of FIG. 1A utilizes two 3-port circulators (18a and 18b). In other embodiments, circular interconnection may also be implemented using isolators, a four-port circulator, or other devices or combination of devices that may establish circular interconnection.

Some exemplary aspects of the disclosure may be directed to an apparatus and method for applying RF energy to an energy application zone. An exemplary apparatus may include one or more emitting radiating elements connected to an amplifier by a transmission line (e.g., a coaxial cable). These one or more emitting radiating elements may be used for emitting energy from the amplifier (or any other source or a component in the source) into the energy application zone. The apparatus may further include one or more sets of radiating elements configured to emit back into the energy application zone energy not dissipated in the zone. The radiating elements configured to emit back energy into the zone may face the energy application zone, e.g., may face an object placed in the energy application zone.

Each of the sets of radiating elements may include at least first and second radiating elements circularly interconnected, such that energy received by the first radiating element from the energy application zone may be emitted back to the energy application zone by the second radiating element; and vice versa, i.e., energy received from the energy application zone by the second radiating element may be emitted back to the energy application zone by the first radiating element. In some embodiments, the set may consist of a pair of radiating elements. Alternatively, the set of radiating elements may include more than two radiating elements. For example, three radiating elements may be circularly interconnected, such that energy received by the first radiating element may be emitted back by the second radiating element; energy received by the second radiating element may be emitted back by the third radiating element; and energy received by the third radiating element may be emitted back by the first radiating element. In some embodiments, a set of receiving radiating elements may include between 3 and 6 radiating elements.

The set of receiving radiating elements, comprising at least first and second radiating elements sequentially interconnected such that energy received by one of the receiving radiating element from the energy application zone is emitted back to the energy application zone by the next radiating element in the sequence and energy received by the last radiating element in the sequence from the energy application zone is emitted back to the energy application zone by the first radiating element in the sequence.

Some embodiments of the disclosure may include a method for applying RF energy to an energy application zone (e.g., for processing an object placed in the zone). The method comprising: receiving by a first receiving radiating element a first amount of RF energy from the energy application zone and emitting back to the energy application zone the first amount through a second receiving radiating element; and receiving by the second radiating element a second amount of RF energy from the energy application zone and emitting back to the energy application zone the second amount through the first radiating element. In some embodiments, the method may further comprise applying RF energy to the energy application zone at one or more MSEs via at least one emitting radiating element. In some embodiments, the method may further comprise controlling the application of the RF energy to the energy application zone based on EM feedback received from the energy application zone by the emitting radiating element(s). In some embodiments, the RF energy application may be controlled based on EM feedback received from the energy application zone by at least one of the receiving radiating elements. Some embodiments may include controlling the RF energy applied to the energy application zone at the one or more MSEs based on an EM feedback received from the energy application zone at corresponding MSE.

Some embodiments of the disclosure may include a method of making or manufacturing an apparatus for applying RF energy to an object in an energy application zone. The method may include installing at least one set of receiving radiating elements in the energy application zone. In some embodiments, the at least one set of receiving radiating elements may be circularly interconnected. Alternatively, the receiving radiating elements of the set may be non-connected, or interconnected in a non-circular manner. Alternatively, the receiving radiating elements of the set may be disconnected from each other. In some embodiments, the method may include circularly interconnecting the set of receiving radiating elements, for example, as part of the installation step.

The drawings and detailed description which follow contain numerous alternative examples consistent with the invention. A summary of every feature disclosed is beyond the object of this summary section. For a more detailed description of exemplary aspects of the invention, reference should be made to the drawings, detailed description, and claims, which are incorporated into this summary by reference.

BRIEF DESCRIPTION OF THE DRAWINGS

FIG. 4 is a flowchart of an exemplary method for making an apparatus for applying RF energy to an energy application zone, in accordance with some exemplary embodiments of the present invention.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

In one aspect, the disclosure involves apparatuses and methods for applying electromagnetic energy. The term electromagnetic energy, as used herein, includes energy deliverable by electromagnetic radiation in all or portions of the electromagnetic spectrum, including but not limited to, radio frequency (RF), infrared (IR), near infrared, visible light, ultraviolet, etc. In one particular example, applied electromagnetic energy may include RF energy with a wavelength in free space of 100 km to 1 mm, which corresponds to a frequency of 3 KHz to 300 GHz, respectively. In some other examples, the applied electromagnetic energy may fall within frequency bands between 500 MHz to 1500 MHz or between 700 MHz to 1200 MHz or between 800 MHz to 1 GHz. Applying energy in the RF portion of the electromagnetic spectrum is referred herein as applying RF energy. Microwave and ultra high frequency (UHF) energy, for example, are both within the RF range. In some other examples, the applied electromagnetic energy may fall only within one or more ISM frequency bands, for example, between 433.05 and 434.79 MHz, between 902 and 928 MHz, between 2400 and 2500 MHz, and/or between 5725 and 5875 MHz. Even though examples herein are described in connection with the application of RF energy, these descriptions are provided to illustrate a few exemplary principles of the invention, and are not intended to limit the invention to any particular portion of the electromagnetic spectrum.

Figure 1A:
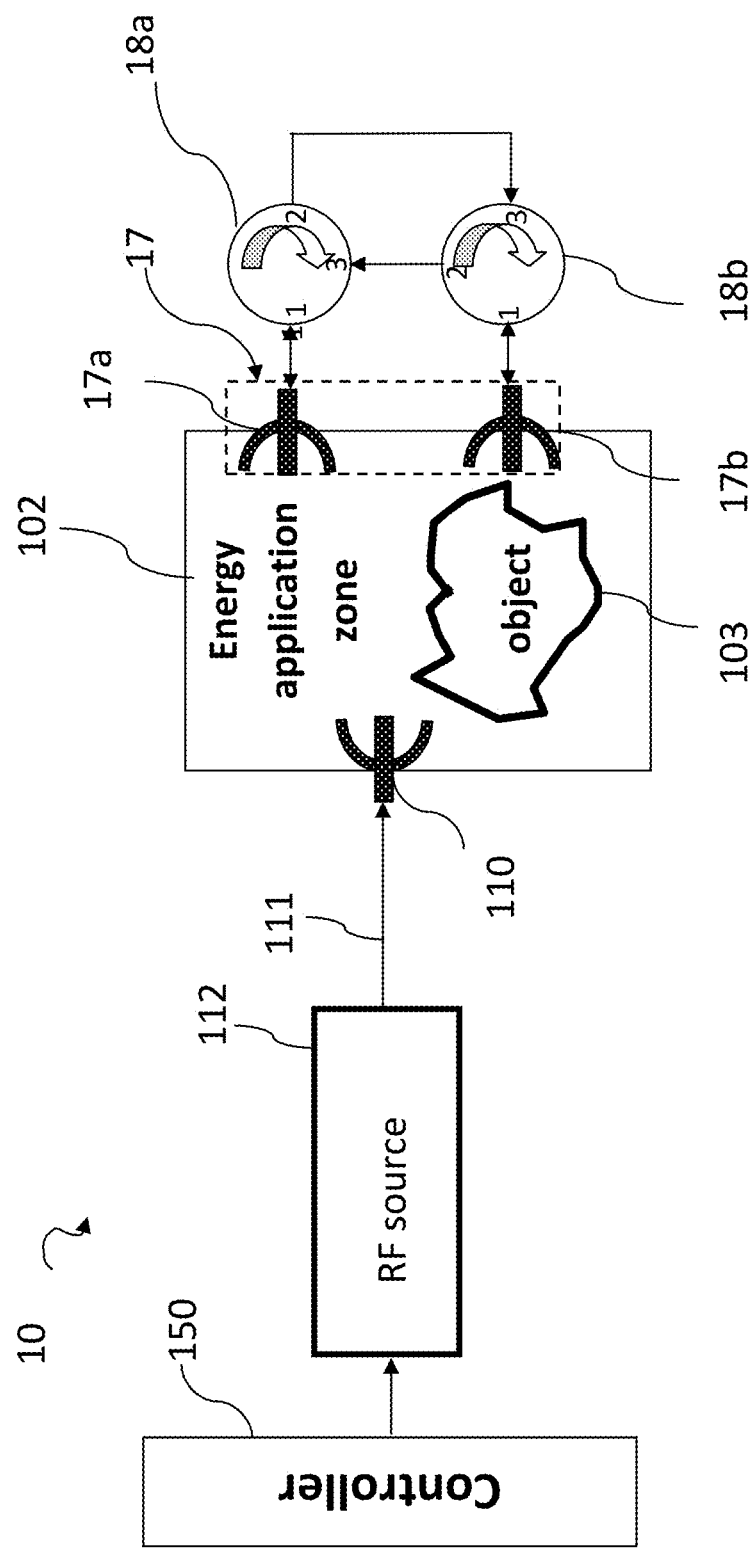
FIGS. 1A-1C are diagrammatic representations of exemplary apparatuses for applying RF energy to an object, in accordance with some exemplary embodiments of the present invention.
Figure 1B:
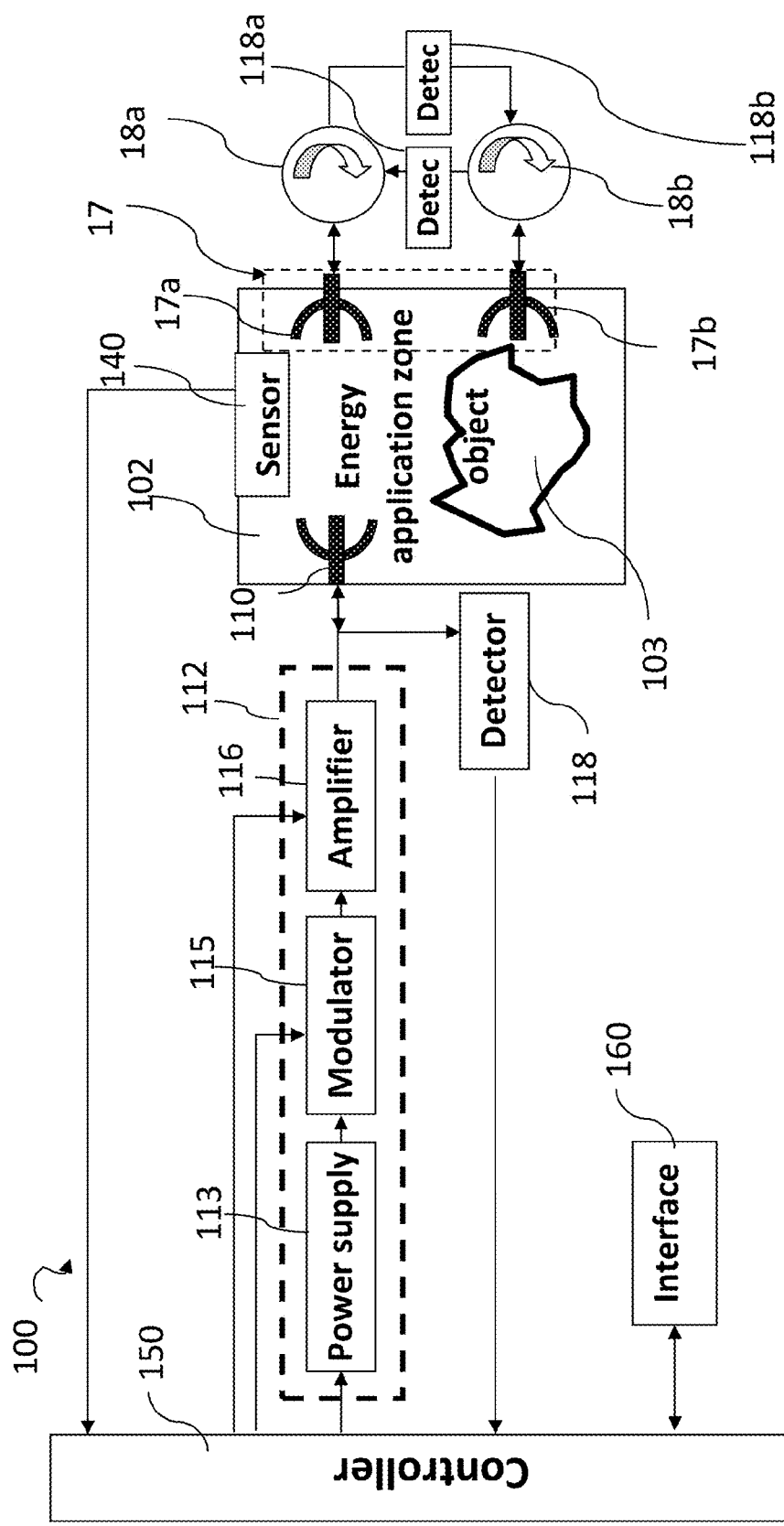

In certain embodiments, RF energy may be applied to an energy application zone, such as energy application zone 102, illustrated in FIGS. 1A and 1B. Energy application zone 102 may include any cavity, void, location, region, or area where electromagnetic energy may be applied. It may be hollow, or may be filled or partially filled with liquids, solids, gases, or combinations thereof. By way of example only, energy application zone 102 may include an interior of an enclosure, interior of a partial enclosure, open space, solid, or partial solid that allows existence, propagation, and/or resonance of electromagnetic waves. Zone 102 may include a conveyor belt or a rotating plate.

In certain embodiments, electromagnetic energy may be applied to an object, e.g., object 103 in FIG. 1A, placed in the energy application zone, e.g., energy application zone 102. It is to be understood that an object is considered in the energy application zone if at least a portion of the object is located in the zone. Reference to an object (or object to be heated or object to be processed) to which electromagnetic energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term object may encompass such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, electromagnetic energy.

In some embodiments, a portion of electromagnetic energy delivered to energy application zone 102 may be absorbed by object 103. In some embodiments, another portion of the electromagnetic energy delivered to energy application zone 102 may be absorbed by various elements (e.g., food residue, particle residue, additional objects, structures associated with zone 102) or any other electromagnetic energy-absorbing materials found in zone 102 or associated with energy application zone 102. Energy application zone 102 may also include loss constituents that do not, themselves, absorb an appreciable amount of electromagnetic energy, but otherwise account for electromagnetic energy losses. Such loss constitutes may include, for example, cracks, seams, joints, door(s), interface between cavity body and a door, or any other loss mechanisms associated with energy application zone 102. Thus, in some embodiments, energy dissipated in the zone may include energy dissipated in at least a portion of object 103 along with any electromagnetic energy-absorbing constituents in the energy application zone as well as any electromagnetic energy loss constituents associated with the zone.

Exemplary energy application zone 102 may include locations where energy is applied in: an oven (i.e., an RF oven—e.g., a cooking oven), chamber, tank, dryer, thawer, dehydrator, reactor, engine, chemical or biological processing apparatus, furnace, incinerator, material shaping or forming apparatus, conveyor, combustion zone, filter, cooler, freezer, etc. In some embodiments, the energy application zone may be part of a vending machine, in which objects are processed once purchased.

Consistent with the presently disclosed embodiments, energy application zone 102 may include an electromagnetic resonator (also known as cavity resonator). A cavity may include any structure that supports the development of standing and/or propagating waves at the frequencies supplied from the source to the radiating elements. Alternatively, energy application zone 102 may include a cavity configured to support mainly propagating (i.e., traveling) waves, rather than resonating waves. In some embodiments, energy application zone 102 may be congruent with the object or a portion of the object (e.g., the object or a portion thereof, may define the energy application zone).

Figure 1C:
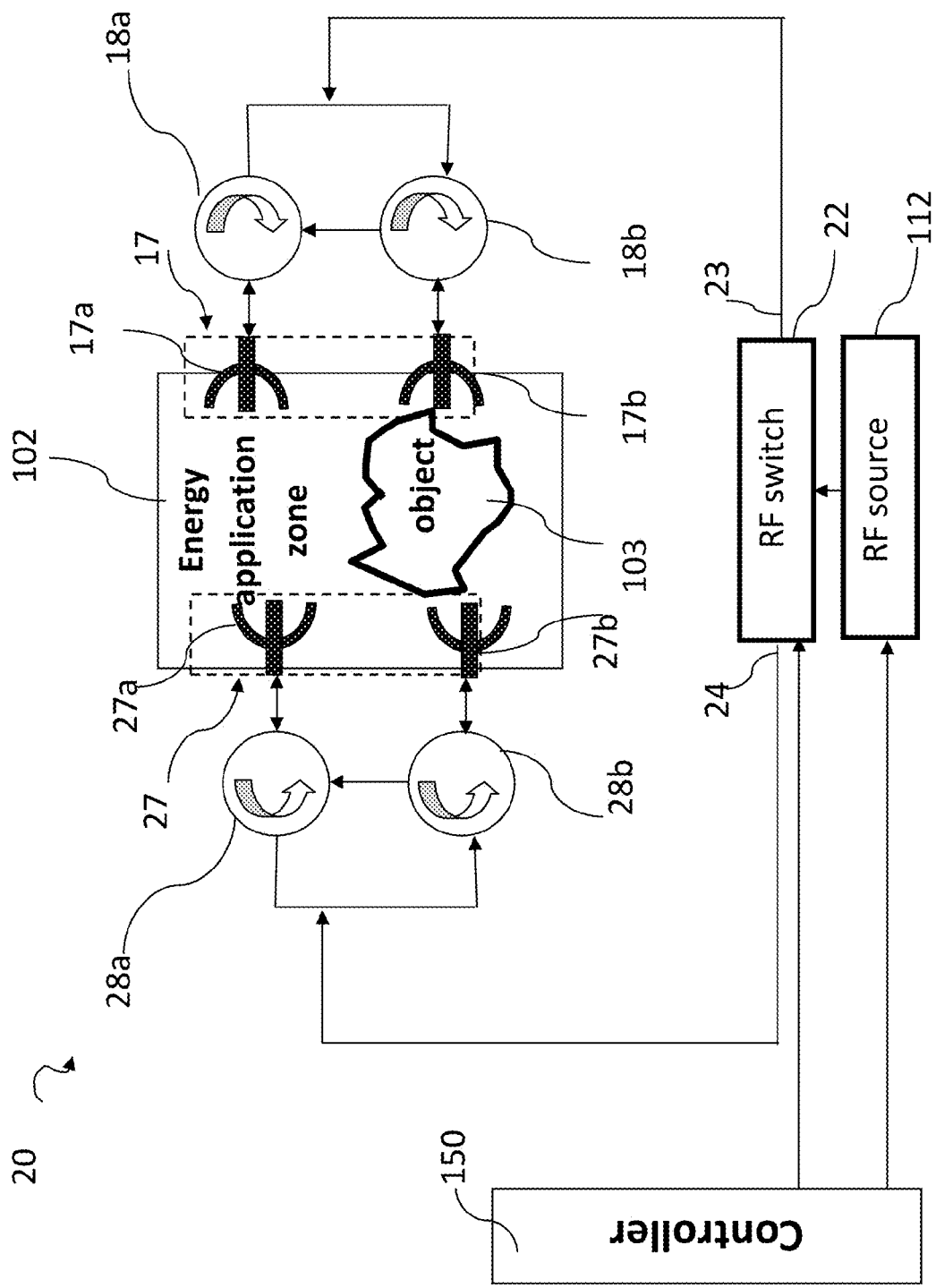

FIGS. 1A-1C include diagrammatic representations of exemplary apparatuses 10, 100, and 20 for applying electromagnetic energy to an object, in accordance with some embodiments. Apparatuses 10 and 20 may be feedback-free, and apparatus 100 may be feedback-enabled. A feedback-free apparatus according to some embodiments may be an RF energy application apparatus wherein the RF energy applied is not controlled based on an EM feedback received (e.g., from a detector) from the energy application zone. RF energy in a feedback-free apparatus may be controlled by other parameters, for example, predetermined power levels. A feedback-enabled apparatus according to some embodiments may be an RF energy application apparatus wherein the RF energy applied is controlled based on an EM feedback (e.g., a dissipation ratio) received from the energy application zone.

Apparatus 10 of FIG. 1A may include one or more emitting radiating elements 110. Emitting radiating elements 110 may include any elements, systems, arrays of elements, etc., designed or configured to transmit or emit RF energy. For example, radiating elements 110 may include any antennas, arrays of antennas, RF feeds, waveguides, slow wave antennas, patch antennas, etc. In the presently disclosed embodiments, more than one emitting radiating element may be provided. Radiating elements according to some embodiments may further be configured to receive RF energy from the energy application zone and transfer the received energy or coupled energy to another element (e.g., a detector and/or a dummy load and/or other radiating element). A radiating element, as used herein, may function as an emitter, a receiver, or both, depending on a particular application and configuration. For example, a radiating element may function as a receiver (e.g., a receiving radiating element) of electromagnetic energy from an energy application zone.

As shown in FIG. 1A, apparatus 10 may further include a set 17 of circularly interconnected radiating elements configured to receive RF energy from zone 102. Set 17 includes two radiating elements, 17a and 17b. Apparatuses 10, 100, and 20 are illustrated as comprising sets of circularly interconnected radiating elements that include a pair of elements. The pairs are illustrated by way of an example only, and the invention is not limited to any number (e.g., 3, 4, 5 or more) of circularly interconnected radiating elements in a set. In FIG. 1A, a single pair, including radiating elements 17a and 17b, is shown. In some embodiments, more than one pair of circularly interconnected radiating elements may be provided. Radiating elements 17a and 17b may be similar to or different from radiating element 110. Radiating element 110 may also be configured to receive electromagnetic energy from energy application zone 102. Differences between radiating element 110 and radiating elements 17a/17b, and/or between radiating elements 17a and 17b may include, for example, differences in geometry, orientation, and/or polarization.

Radiating elements 17a and 17b may be circularly interconnected via two three-port circulators 18a and 18b. In some embodiments, radiating elements 17a and 17b may be circularly interconnected by other measures, e.g., by cables with or without directional couplers, and by other circulators. A circulator may be a multi-port RF device, in which RF power entering any port is transmitted only to the next port in a predetermined direction. Common circulators may have 2, 3, 4, or 5 ports (where 2-port circulators may also be referred to as isolators). The ports may be arranged in a rotational manner. For example, if numbers are assigned to the ports of circulators 18a and 18b clockwise, energy that enters a circulator via port 1 may exit the circulator at port 2; energy that enters via port 2 may exit via port 3; and energy that enters via port 3 may exit via port 1. Thus, RF energy that is received from zone 102 from radiating element 17a may be transferred to radiating element 17b through circulators 18a and 18b and emitted back to zone 102 by radiating element 17b.

Similarly, RF energy received from zone 102 at radiating element 17b may be transferred to radiating element 17a through circulators 18a and 18b, and emitted back to zone 102 by radiating element 17a.

For example, energy received from energy application zone 102 may enter circulator 18a (via radiating element 17a) at port 1 and may exit circulator 18a at port 2. As illustrated in FIG. 1A, port 2 of circulator 18a is connected to port 3 of circulator 18b, therefore, the energy may pass into circulator 18b via port 3 and may exit back (i.e., emitted back) into the energy application zone 102 via port 1 of circulator 18b and radiating element 17b.

Similarly, energy received from energy application zone 102 may enter circulator 18b (via radiating element 17b) at port 1 and may exit circulator 18b at port 2. As illustrated in FIG. 1A, port 2 of circulator 18b is connected to port 3 of circulator 18a, therefore, the energy may pass into circulator 18a via port 3 and may exit back (i.e., emitted back) into the energy application zone via port 1 of circulator 18a and radiating element 17a.

In some embodiments, radiating element 110 may be connected to an RF energy source 112 via an RF transmission line 111. RF energy source 112 may be any device configured to generate RF energy and supply RF energy to radiating element(s) 110 and cause RF energy to be applied to energy application zone 102 via at least one radiating element 110. For example, RF source 112 may include a magnetron configured to supply high power RF energy within a single ISM band of frequencies. Additionally or alternatively, RF source 112 may include an oscillator configured to supply RF energy at a single or a plurality of frequencies.

In some embodiments, apparatus 10 may further include a controller 150. Controller 150 may include any electric circuit that performs a logic operation on input or inputs. For example, controller 150 may include one or more integrated circuits, microchips, microcontrollers, microprocessors, all or part of a central processing unit (CPU), graphics processing unit (GPU), digital signal processor (DSP), field-programmable gate array (FPGA) or other circuits suitable for executing instructions or performing logic operations.

Controller 150 may control RF source 112 to supply RF energy to at least one radiating element 110, to cause the radiating element(s) to emit RF energy to energy application zone 102. The at least one radiating element 110 may be configured to feed energy at specifically chosen (e.g., predetermined) modulation space elements, referred to herein as MSEs, which may also be chosen or determined by controller 150. An MSE may be an element in a modulation space. The term "modulation space" or "MS" is used to collectively refer to all the parameters that may affect a field pattern in the energy application zone and all combinations thereof. In some embodiments, the "MS" may include all possible components that may be used and their potential settings (absolute and/or relative to others) and adjustable parameters associated with the components. For example, the "MS" may include a plurality of variable parameters, the number of radiating elements, their positioning and/or orientation (if modifiable), the useable bandwidth, a set of all useable frequencies and any combinations thereof, power settings, phases, amplitudes, etc. The MS may have any number of possible variable parameters, ranging from one parameter only (e.g., a one dimensional MS limited to frequency only or phase only, or other single parameter), two or more dimensions (e.g., varying frequency and amplitude or varying frequency and phase together within the same MS), to many more.

Reference is now made to FIG. 1B, which is a block diagram of exemplary apparatus 100, according to some embodiments. Apparatus 100 may include at least one emitting radiating element 110 configured to apply (e.g., emit) RF energy to energy application zone 102. Radiating element 110 may be any element, system, array of elements, etc., configured to emit and/or receive RF energy. Energy application zone 102 may include an enclosure with defining surfaces. The radiating elements may be located on one or more of the surfaces that define zone 102 (e.g., cavity walls). For example, radiating elements 110 and 17a may be located on two different (e.g., opposing) surfaces of energy application zone 102. In some embodiments, one or more of the radiating elements may be located inside zone 102 (e.g., radiating element 204c illustrated in FIG. 2) or partially located inside zone 102 (e.g., elements 17a and 17b, as illustrated in FIGS. 1A and 1B). Additionally or alternatively, a radiating element may be located outside the energy application zone (e.g., element 204b illustrated in FIG. 2). One or more of the radiating elements may be near to, in contact with, in the vicinity of or even embedded in object 103 (e.g., when the object is liquid), for example—radiating element 204c illustrated in FIG. 2. The orientation and/or configuration of each radiating element may be distinct or the same, based on the specific energy application, e.g., based on a desired target effect. Each radiating element may be positioned, adjusted, and/or oriented to emit electromagnetic waves along a same direction, or various different directions. Furthermore, the location, orientation, and configuration of each radiating element may be predetermined before applying energy to the object. Alternatively or additionally, the location, orientation, and/or configuration of each radiating element may be dynamically adjusted, for example, by using a controller (e.g., controller 150), during operation of the apparatus and/or between rounds/cycles of energy application. The invention is not limited to radiating elements having particular structures or locations within the apparatus.

As shown in FIG. 1B, apparatus 100 may include at least one radiating element 110 for emitting electromagnetic energy to energy application zone 102 and at least two receiving radiating elements 17a and 17b. Elements 17a and 17b may be configured to receive electromagnetic energy from energy application zone 102 and emit the coupled energy back to zone 102. Elements 17a and 17b may be connected via circulators 18a and 18b as discussed above with respect to FIG. 1A. Elements 17a and 17b may be circularly interconnected such that RF energy received by element 17a may be emitted back by element 17b and RF energy received by element 17b may be emitted back by element 17a.

Some aspects of the present invention may involve detecting, measuring, or sensing RF energy emitted from the radiating element(s) (e.g., radiating elements 110 and/or 17a/17b) to energy application zone 102 or received by the radiating element(s) from the energy application zone. A detector configured to measure and/or detect various parameters of the emitted and/or received RF energy may be associated with at least one radiating element. The detector may detect and/or measure EM feedback related to the RF energy emitted and/or received. The EM feedback may include all detectable parameters of the RF emission, for example: power, frequency, energy, current, voltage, phases between emissions, etc. The EM feedback may also include any combination of the detectable parameters, for example, network parameters (e.g., S parameters), gamma parameters, dissipation ratios, etc. For example, detector 118, illustrated in FIG. 1B, may be associated with radiating element 110. Detector 118 may be configured to measure or detect one or more parameters related to the RF energy emitted by element 110 and one or more parameters related to the RF energy reflected back to element 110. Apparatus 100 may further include detectors 118a and 118b. Detectors 118a and 118b may be configured to detect RF energy received at radiating elements 17a and 17b, respectively, for example, as a result of RF energy emission from element 110. Additionally or alternatively, detectors 118a and 118b may be configured to detect RF energy transferred between radiating elements 17a and 17b via circulators 18a and 18b. In order to detect parameters of both energy emitted and received by elements 110, 17a, and 17b, detectors 118, 118a, and 118b may comprise or may be associated with one or more couplers (e.g., dual directional couplers—not illustrated) configured to distinguish between the forward (emitted) and backward (received) energy. In some embodiments, detector 118 may be associated with two or more radiating elements (e.g., radiating elements 110 and 17a and 17b). In some embodiments, each radiating element may be associated with a separate detector, as illustrated in FIG. 1B. In some embodiments, all the radiating elements may be associated with a single detector. The detector may be switched to detect at different instances signals arriving from different radiating elements.

Consistent with some disclosed embodiments, RF energy may be supplied to one or more emitting radiating elements from RF source 112. Energy supplied to the emitting radiating element (e.g., element 110) from RF source 112 may be referred to herein as supplied energy, and denoted as S.

Some of the supplied RF energy may be absorbed by the object or the load (e.g., object 103). This portion of energy may be referred to herein as absorbed energy or dissipated energy and denoted as A.

A portion of the supplied RF energy may be reflected back to the emitting element (e.g., element 110). This portion of energy may be referred to herein as reflected energy, and denoted as R. The reflected energy may be reflected at the interface between the radiating element and the energy application zone. Alternatively or additionally, the reflected energy may include energy that is reflected from the energy application zone, for example, from the object or from a wall defining the zone, etc.

Figure 2:
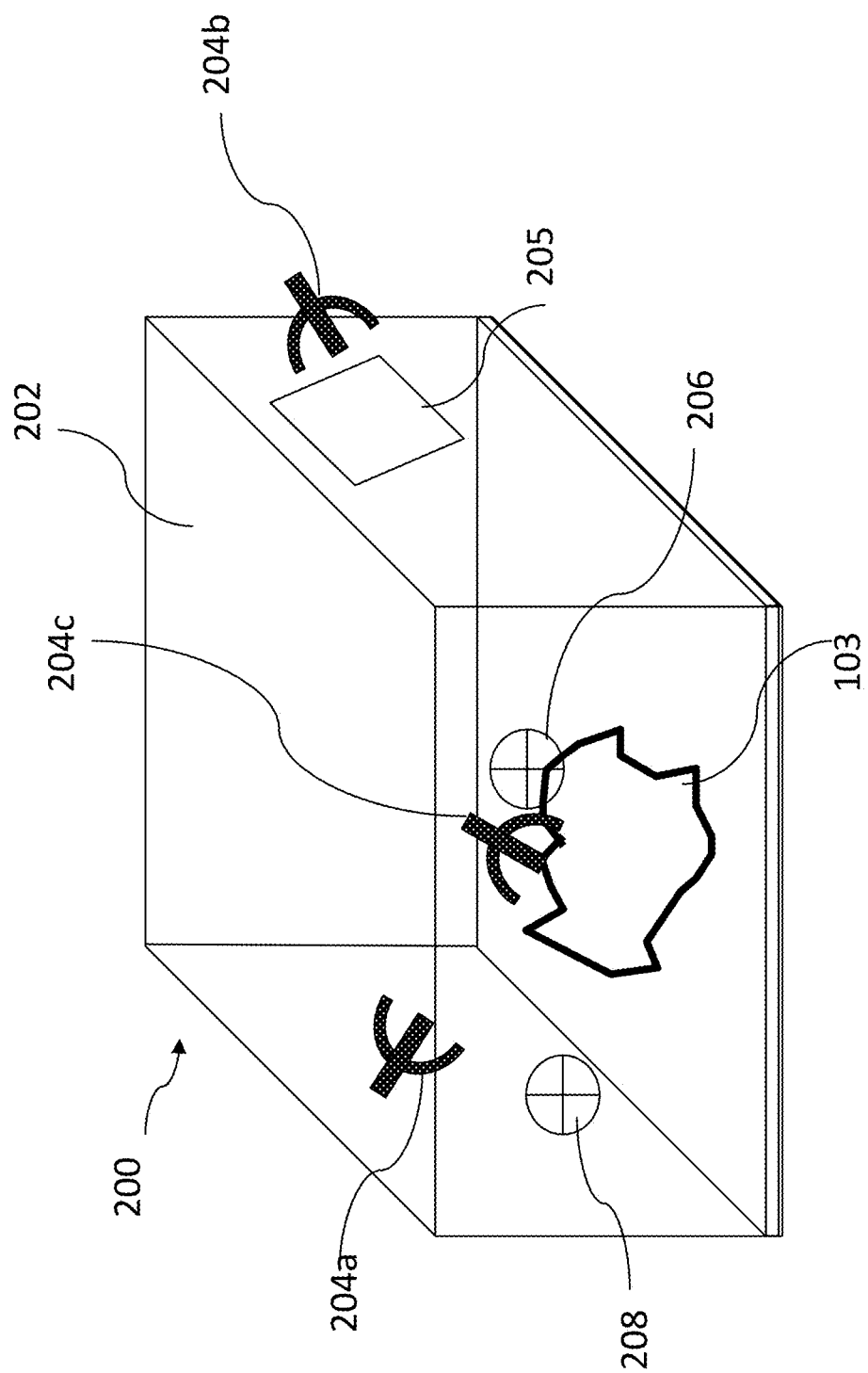
FIG. 2 is a diagrammatic representation of a cavity, in accordance with some exemplary embodiments of the present invention.

The rest of the supplied energy may be coupled to other radiating elements in the energy application zone (for example, the receiving radiating elements 17a and 17b shown in FIGS. 1A and 1B, a sensor, e.g., sensor 206 or 208 shown in FIG. 2, etc.). This portion of energy may be referred to herein as coupled energy, and denoted as C.

In some embodiments, the supplied RF energy may include energy that is reflected back to the emitting radiating element, absorbed in the load, and coupled to one or more of other radiating element(s). Equation (1) characterizes the relationship of these entities as follows:

$$S = R + A + C \quad (1)$$

The difference between the amount of energy supplied to a radiating element and the amount of energy reflected back to that radiating element may be referred to herein as delivered energy, and may be denoted as D. One or more detectors (e.g., detector 118) may be configured to detect and measure the supplied, reflected, and coupled energy values, and a controller (e.g., controller 150) may be configured to determine the delivered and/or absorbed amounts of energy, for example, based on equation (1). This may result in the following equations:

$$A = S - (R + C) \quad (2a)$$

$$D = S - R \quad (2b)$$

$$D = A + C \quad (2c)$$

In some embodiments, a portion of the coupled energy C may be received by element 17a, and another portion of the coupled energy C may be received by element 17b. These portions may be denoted as $C_a$ and $C_b$, respectively. In some embodiments, for example—when a single emitting radiating element is used, the coupled energy C may be equal to the sum of $C_a$ and $C_b$. $C_a$ may be transferred via circulator 18a to radiating element 17b and emitted by element 17b back to energy application zone 102. Additionally, $C_b$ may be transferred via circulator 18b to radiating element 17a and emitted by element 17a back to energy application zone 102. The readings of detector 118a may then be equal to $C_b$, and the readings of detector $118_b$ may then be equal to $C_a$.

In some embodiments, detector 118a may be coupled to radiating element 17a directly, and not via circulator 18a (for example as shown in FIG. 1B). Similarly, in some embodiments, detector 118b may be coupled to radiating element 17b directly, and not via circulator 18b (for example as shown in FIG. 1B). In these embodiments, the readings of detector 118a may be equal to $C_b$, and the readings of detector $118_b$ may be equal to $C_a$. Apparatus 100 may further include a source for supplying RF energy to the radiating element(s), for example, source 112 of FIG. 1B may supply RF energy to emitting element 110. A source may include any component(s) that may be suitable for generating and supplying electromagnetic energy. The source may include one or more power supplies 113 configured to generate electromagnetic waves that carry electromagnetic energy. For example, power supply 113 may be a magnetron configured to generate high power microwave at a predetermined wavelength or frequency. Alternatively or additionally, power supply 113 may include a semiconductor oscillator, e.g., a voltage controlled oscillator, configured to generate AC waveforms (e.g., AC voltage or current) with a controllable frequency. The frequency may be controlled to be constant or to vary. AC waveforms may include sinusoidal waves, square waves, pulsed waves, triangular waves, or another type of waveforms with alternating polarities. Alternatively or additionally, a source of electromagnetic energy may include any other power supplies, e.g., electromagnetic field generator, electromagnetic flux generator, or any mechanism for generating vibrating electrons.

Consistent with some embodiments, RF energy may be supplied to the energy application zone in the form of propagating RF waves at predetermined wavelengths or frequencies (also known as RF radiation). As used herein, "propagating RF waves" may include resonating waves, traveling waves, evanescent waves, and waves that travel through a medium in any other manner. RF radiation carries energy that may be imparted to (or dissipated into) matter with which it interacts.

In some embodiments, the source (e.g., source 112) may further include at least one modulator 115 and/or at least one amplifier 116. The modulator may include a phase modulator, a frequency modulator, an amplitude modulator, an oscillator or any other modulator configured to modulate at least one aspect of the RF energy supplied to the radiating element. The amplifier may be any apparatus configured to change (e.g., amplify) the amplitude of the RF waves supplied by the power supply. It is to be noted that the source (e.g., source 112) may include only one component or more than one component or any combination of components according to the demand of particular embodiment. The power supply, the modulator, and the amplifier may each be controlled by a controller (e.g., controller 150), as will be discussed in greater details below.

Apparatus 100 may further include at least one sensor, such as sensor 140. Sensor 140 may be installed in or around energy application zone 102. Sensor 140 may be configured to detect and/or measure an EM feedback, for example the intensity of EM field excited in the energy application zone. Additionally or alternatively, sensor 140 may be configured to detect and/or measure other signals or feedbacks related to the object or the energy application zone. For example, sensor 140 may include a thermometer configured to measure the temperature of the object and/or the energy application zone (e.g., a thermocouple or an IR sensor). Sensor 140 may include a humidity sensor, a pressure sensor (e.g., a barometer), a pH sensor configured to measure the pH value of a solution when the object comprises liquids. Sensor 140 may be configured to measure the weight of at least a portion of the object (e.g., a scale). Sensor 140 may be configured to measure any detectable and measurable property of the object or the energy application zone. Sensor 140 may be configured to send feedback signals to controller 150. In some embodiments, more than one sensor 140 may be provided and they can be of a same kind or different kinds (e.g., a temperature sensor and a weight sensor may be provided).

In some embodiments, apparatus 100 may include a controller (e.g., controller 150). The instructions executed by the controller may, for example, be pre-loaded into a memory unit integrated with or embedded into the controller or may be stored in a separate memory unit, such as a RAM, a ROM, a hard disk, an optical disk, a magnetic medium, a flash memory, other permanent, fixed, or volatile memory, or any other mechanism capable of storing instructions for the controller. The separate memory unit may or may not be a part of the controller. The controller may be customized for a particular use, or can be configured for general-purpose use and can perform different functions by executing different software.

If more than one controller or processor is employed, all may be of similar construction, or they may be of differing constructions electrically connected or disconnected from each other. They may be separate circuits or integrated in a single circuit. When more than one controller or processor is used, they may be configured to operate independently or collaboratively. They may be coupled electrically, magnetically, optically, acoustically, mechanically or by other means permitting them to interact.

In some embodiments, at least one controller may be configured to cause RF energy application or delivery via at least one emitting radiating element to the energy application zone. Controller(s) 150 may control at least one RF source (e.g., source(s) 112) to supply RF energy to at least one emitting radiating element (e.g., element(s) 110) to cause the radiating elements to emit RF energy to energy application zone 102.

In some embodiments, receiving radiating elements (e.g., radiating elements 17a and 17b) may also function as emitting radiating elements, as discussed below in reference to FIG. 1C. FIG. 1C is a diagrammatic presentation of an exemplary apparatus 20, according to some embodiments. Apparatus 20 may include two or more pairs of radiating elements (e.g., 17 and 27), wherein each radiating element in at least one of the pairs may be configured to receive RF energy from the energy application zone and to emit energy into the energy application zone. For example, in pair 17, energy emitted by radiating element 17a may include energy supplied to the radiating element from source 112. Additionally or alternatively, energy emitted by radiating element 17a may include energy transferred to the radiating element from its mate radiating element 17b via circulators 18a and 18b. Pair 27 may include radiating elements 27a and 27b. Radiating elements 27a and 27b may be circularly interconnected via circulators 28a and 28b, similar to elements 17a and 17b. Elements 27a and 27b may or may not be similar or identical to elements 17a and 17b; and circulators 28a and 28b may or may not be similar or identical to circulators 18a and 18b. For example, pair 17 may be designed to be mounted on one of cavity walls and pair 27 may be designed to be located in proximity to the object (e.g., object 103), or even embedded in the object.

In some embodiments, the emitting radiating elements (e.g., element 110 in apparatus 10 or elements 17a and 17b in apparatus 20) and the receiving radiating elements (e.g., elements 17a and 17b in apparatus 10 or elements 27a and 27b in apparatus 20) may be installed facing different portions of the object. For example, they may be installed on different surfaces of the energy application zone. In such embodiments, energy supplied from the RF source to a radiating element or to a pair of radiating elements (e.g., radiating element 110 in apparatus 10 or pair 17 of apparatus 20, when the RF switch 22 connects pair 17 to RF source 112) may be emitted into the energy application zone and absorbed by a first portion of the object; while energy received from the energy application zone and emitted back to the zone by other radiating elements (e.g., elements 17a and 17b in apparatus 10 or pair 27 in apparatus 20, when the RF switch 22 disconnects pair 17 from RF source 112) may be absorbed in a second portion of the object. In embodiments where different portions of the object may have different abilities to absorb RF energy, installing the emitting radiating elements and the receiving radiating elements to face different portions of the object may increase the overall energy absorption by the object without requiring increase in energy input from the source. In some embodiments, such arrangement may also increase heating uniformity.

Additionally or alternatively, circularly interconnected radiating elements may be installed to face different portions of the object. For example, radiating element 27a may be installed at the top of energy application zone 102, and radiating element 27b may be installed at the bottom of the energy application zone 102. Radiating elements (e.g., elements 27a and 27b) may be installed on the same wall or on different walls of a cavity.

In embodiments in which circularly interconnected radiating elements are installed on different walls of the cavity, EM waves emitted by radiating element 27a, may propagate along a direction facing one portion of the object (e.g., the wave front faces one portion of the object); while EM waves emitted from radiating element 27b may propagate along a direction facing a different portion of the object (e.g., the wave front faces a different portion of the object). The EM waves emitted by radiating element 27a may include waves supplied from RF source 112 to radiating element 27a and/or waves supplied from RF source 112 to radiating element 27b but reflected back and transferred to radiating element 27a. Similarly, the EM waves emitted by radiating element 27b may include waves supplied from RF source 112 to radiating element 27b and/or waves supplied from RF source 112 to radiating element 27a but reflected back and transferred to radiating element 27b. In embodiments where different portions of the object may have different abilities to absorb RF energy, installing the receiving radiating elements to face different portions of the object may increase the overall energy absorption by the object without requiring increase in energy input from the source. In some embodiments, such arrangement may also increase heating uniformity.

Additionally or alternatively, each of the radiating elements may be located in the energy application zone, such that RF waves emitted from each of the radiating elements, either supplied directly from the RF source or received from the zone and circulated back into the energy application zone, may face different portions of the object (e.g., four different portions if two pairs are installed, or three portions if a single emitting element and two receiving elements are installed, etc.). Such arrangements may lead to increase in the amount of the RF energy absorbed by the object and/or in the uniformity of RF energy absorption by the object.

In some embodiments, for example, when it is important to apply RF energy to a particular portion of the object, for example, when baking a flat pastry, such as a Pizza, all the elements may be installed facing a particular portion, e.g., installed on the same surface of the energy application zone.

The radiating elements in FIG. 1C are illustrated as being installed such that each pair of elements (17 and 27) is located on one of two opposite walls, by way of an example only and the invention is not limited to any location of any radiating element.

Apparatus 20 may further include an RF energy source 112. Source 112 may be any source configured to supply RF energy. Source 112 may be connected to an RF switch 22. Switch 22 may be any device configured to receive RF energy and transfer the RF energy to one of at least two ports, e.g., to switch between two or more ports. When switch 22 shifts energy to port 23, RF energy from source 112 may be supplied to radiating elements 17a and/or 17b, which then act as "emitting elements," and may emit at least a portion of this energy to energy application zone 102.

Under this configuration, radiating elements 27a and 27b may act only as receiving radiating elements. When switch 22 shifts energy to port 24, RF energy from source 112 may be supplied to radiating elements 27a and/or 27b, which then act as emitting elements, and may emit at least a portion of this energy to energy application zone 102. Under this configuration, radiating elements 17a and 17b may act only as receiving radiating elements. Controller 150 may be configured to control the application of RF energy to zone 102 via pair 17 or pair 27, by switching the supply between ports 23 and 24. In some embodiments, RF energy may be supplied from RF energy source 112 via port 23 to be emitted by radiating elements 17a and/or 17b. Some portion of the RF energy supplied to and emitted by radiating elements 17a and/or 17b may be coupled to radiating elements 27a and/or 27b via zone 102 and circulated (emitted) back to zone 102 by the other member of the pair.

Controller 150 may be configured to switch between two or more states. In one state, a first pair of the radiating elements (e.g., radiating elements 27a and 27b) may supply RF energy to zone 102 from RF energy source 112 (e.g., via port 24) and a second pair of radiating elements (e.g., radiating elements 17a and 17b) may circulate (emit) back into zone 102 RF energy received by the second pair (17). In the second state, the two pairs (17 and 27) may exchange roles, for example, the second pair of radiating elements (17a and 17b) may supply RF energy to zone 102 from RF energy source 112 and the first pair of radiating elements (27a and 27b) may circulate back, into zone 102, RF energy received by the second pair (27). In some embodiments, there may be more than two pairs of radiating elements, and controller 150 may be configured to switch between states in which one or more pairs emit energy received from source 112, and the other pairs circulate back into the zone energy received from the zone (coupled energy).

Controller 150 may control the switching between radiating element pairs according to a predetermined time interval (e.g., every 50 msec, 1 sec, 5 sec, 10 sec, 1 min, etc). In some embodiments, controller 150 may control the switching based on EM feedback received from the energy application zone.

In some embodiments when RF energy is supplied to a pair or a set of circularly interconnected radiating elements acting as emitters, the RF energy may be emitted simultaneously from all radiating elements in the set, from a single radiating element in the set or from two or more radiating elements in the set (e.g., two elements from three interconnected elements). For example, a splitter (not illustrated) may be provided between port 23 of RF switch 22 and circulators 18a and 18b which may split an RF signal generated by RF source 112 into two signals (e.g., split signals), each may be fed in respective circulator 18a and 18b (to be emitted simultaneously by the radiating elements). In some embodiments, various time delays may be performed between the split signals such that a phase difference between the two split signals may be achieved. In some embodiments, the phase difference may vary over time. Controller 150 may be configured to control such phase differences.

Alternatively or additionally, port 23 of RF switcher (not illustrated) may be comprised on two ports, each connected to respective circulator (18a or 18b). Controller 150 may control RF switch 22 such that RF signal generated by RF source 112 is selectively provided to circulator 18a or circulator 18b such that RF energy may be emitted from a single radiating element in set 17. In some embodiments, RF switch 22 may comprise several ports (each connected to respective circulator) and may select between circulators (e.g., 18a, 18b, 27a and 27b) such that RF signal generated by RF source 112 is selectively provided to one circulator such that RF energy may be emitted from a single radiating element (e.g., radiating element 17a, 17b, 27a or 27b). In some embodiments, RF switch 22 may comprise several ports (each connected to respective circulator) and may select between one or more circulators (e.g., 18a, 18b, 28a and 28b) such that RF signal generated by RF source 112 is selectively provided to one or more circulator such that RF energy may be emitted from a one or more radiating elements (e.g., radiating element 17a, 17b, 27a or 27b).

Controller 150 may control the switching between radiating elements according to a predetermined time interval (e.g., every 50 msec, 1 sec, 5 sec, 10 sec, 1 min, etc). In some embodiments, controller 150 may control the switching between radiating elements based on EM feedback received from the energy application zone.

In some embodiments, RF energy may be applied to zone 102 using various energy application parameters. An energy application parameter may be any parameter that may affect a field pattern excited in the energy application zone upon energy application, for example, frequency, position or orientation of a radiating element, phase difference between signals (waves) emitted by two of the radiating elements, etc. The collection of all the combinations of all the possible values of all the energy application parameters controllable in a given energy application device may be referred to as the modulation space of the device. Each such parameter may be referred to herein as an MS dimension. For example, a three dimensional modulation space may include three dimensions designated as frequency (F), phase (P), and amplitude (A). That is, frequency, phase, and amplitude (e.g., an amplitude difference between two or more waves being transmitted at the same time) of the RF waves are modulated during energy application, while all the other parameters may be fixed (or changed in a non-controllable manner) during energy application. In one example, a one dimensional modulation space oven may provide MSEs that differ one from another only by frequency.

The term modulation space element or MSE, may refer to a specific set of values of the variable parameters in MS. Therefore, the MS may also be considered to be a collection of all possible MSEs. For example, two MSEs may differ one from another in the relative amplitudes of the energy being simultaneously supplied to a plurality of radiating elements. For example, a three-dimensional MSE may have a specific frequency F(i), a specific phase P(i), and a specific amplitude A(i). If even one of these MSE variables changes, then the new set defines another MSE. For example, (3 GHz, 30°, 12 V) and (3 GHz, 60°, 12 V) are two different MSEs, although only the phase component is different.

Differing combinations of these MS parameters may lead to differing field patterns across the energy application zone and differing energy distribution patterns in the object. A plurality of MSEs that can be executed sequentially or simultaneously in the energy application zone may be collectively referred to as an energy application protocol. For example, an energy application protocol may consist of three MSEs: (F(1), P(1), A(1)), (F(2), P(2), A(2)), and (F(3), P(3), A(3)). Such an energy application protocol may result in applying the first, second, and third MSE to the energy application zone.

The invention is not limited to any particular number of MSEs or MSE combinations. Various MSE combinations may be used depending on the requirements of a particular application and/or on a desired energy delivery profile, and/or given equipment, e.g., cavity dimensions. The number of options that may be employed could be as few as two or as many as the designer desires, depending on factors such as intended use, level of desired control, hardware or software resolution and cost.

In some embodiments, the controller may control the RF energy by selecting a sub-group or sub-band of MSEs from a plurality of available MSEs. The MSEs available to apparatus 100 include all the modulation space elements in which apparatus 100 may apply energy. The selected sub-group of MSEs may be included in an energy application protocol. The energy application protocol may further include assigning different or similar energy levels to the selected MSEs, for example, by varying respective durations in which a particular EM field pattern is excited in the energy application zone. Additionally or alternatively, different energy levels may be assigned to different MSEs by assigning different power levels for applying energy at each of the different MSEs.

The controller may be configured to select a subgroup of MSEs for energy application and energy levels based on one or more EM feedbacks and/or rules. Some exemplary rules are discussed below. However, the invention is not limited to any particular rule. Some rules may be based on EM feedback received from the energy application zone.

As used herein, EM feedback may include any received signal or any value calculated based on the received signal(s), which may be indicative of the dielectric response of the cavity and/or the object to the applied RF energy. EM feedback may be MSE-dependent, for example, may include signals, the values of which vary over different MSEs. Electromagnetic feedback may include, for example, input and output power levels, scattering parameters (i.e., S parameters) and values derivable from the S parameters and/or from the power levels, for example, input impedance (e.g., of one or more radiating element), dissipation ratio, time or MSE derivative of any of them, or any other value that may be derivable from the received signals.

In some embodiments, the controller may be configured to determine amounts of RF energy to be applied at each MSE (e.g., associate RF energy amounts with each of the MSEs), for example—based on the EM feedback. In certain embodiments, the controller may be configured to determine, from at least a part of the EM feedback, a value indicative of energy absorbable by the object (also referred to herein as an absorbability indicator, or in short, AI) at each of a plurality of MSEs in which energy is applied to the zone. The controller may be configured to associate RF energy amounts with each of the MSEs available for an apparatus based on the AI value at the respective MSE. In some embodiments, the controller may determine not to supply RF energy to MSEs associated with certain AI values, for example, lower than a minimum threshold and/or higher than a maximum threshold. In some embodiments, the controller may associate the same amount of RF energy with MSEs associated with different IA values, for example, with values in a certain range. Additionally or alternatively, the controller may associate different amounts of RF energy with MSEs associated with different AI values. In some embodiments, other rules based on the AI values and/or other EM feedback may be utilized by the controller for determining the amounts of RF energy to be applied.

Applying RF energy to the zone may be done by a sweep and EM feedback may be received and associated with different MSEs during the sweep. As used herein, a sweep may include, for example, the transmission over time of energy at more than one MSE. For example, a sweep may include the sequential transmission of energy at multiple MSEs in one or more contiguous MSE band; the sequential transmission of energy at multiple MSEs in more than one non-contiguous MSE band; the sequential transmission of energy at individual non-contiguous MSEs; and/or the transmission of synthesized pulses having a desired MSE/power spectral content (e.g., a synthesized pulse in time). The MSE bands may be contiguous or non-contiguous. Thus, during an MSE sweeping process, the controller may regulate the energy supplied to the at least one radiating element to sequentially apply RF energy at various MSEs to zone 102, and to receive EM feedback values from zone 102 associated with each MSE.

During the sweeping process, controller 150 may receive EM feedback from the energy application zone and determine a value indicative of energy absorbable (i.e., absorbability indicator AI) by object 103 at each of a plurality of MSEs based on the received feedback. For example, in apparatus 100, AI may be determined at each MSE based on EM feedback indicative of the RF energy supplied to and reflected back to emitting radiating element 110 at the respective MSE. In apparatus 20 of FIG. 1C, when pair 17 acts as an emitting pair, two AI values may be determined for each radiating element in the pair. $AI_a$ value may be determined for element 17a based on EM feedback indicative of the RF energy supplied to and reflected back to element 17a and, in some embodiments, EM feedback indicative of the RF energy coupled to element 17a, at a particular MSE. In the same way $AI_b$ at a particular MSE may be determined for element 17b. These AI values may be used in determining amounts of energy to be applied via element 17a and/or 17b.

Consistent with some disclosed embodiments, a value indicative of the absorbable energy may include a dissipation ratio (referred to herein as DR) associated with each of a plurality of MSEs. As referred to herein, a dissipation ratio (or absorption efficiency or power efficiency) associated with an emitting radiating element may be defined as a ratio between electromagnetic energy absorbed by object 103 and electromagnetic energy supplied into the energy application zones by the emitting radiating element. In some embodiments, a dissipation ratio (or absorption efficiency or power efficiency) associated with an emitting radiating element may be defined as a ratio between electromagnetic energy absorbed by object 103 and electromagnetic energy delivered into the energy application zones by the emitting radiating element.

In some embodiments, a dissipation ratio associated with a radiating element denoted by number j may be calculated using Equation (3):

$$DR_j = (S_j - R_j - C_j)/S_j \quad (3)$$

In equation (3), $S_j$ is the energy supplied by the RF source to emitting radiating element j (e.g., element 110 in apparatus 100), $R_j$ is the RF energy reflected back from the energy application zone to emitting radiating element j, and $C_j$ is the RF energy emitted by radiating element j and coupled to other emitting radiating element(s), when other element(s) are silent and not emitting RF energy.

In apparatus 100, when only element 110 acts as the emitting element, $C_j=0$, and Equation (3) may have the form:

$$DR_j = (S_j - R_j)/S_j \quad (4)$$

In some embodiments, the dissipation ratio DR may be expressed by power values, rather than energy values as discussed above. In such embodiments, the dissipation ratio associated with a radiating element may be defined by equation (5) below (where the subscript defining the radiating element is omitted):

$$DR = (P_S - P_R - P_C)/P_S \quad (5)$$

where $P_S$ represents the RF power supplied to emitting radiating element j (e.g., element 110), $P_R$ represents the RF power reflected to emitting radiating element j, and $P_C$ represents RF power coupled from emitting radiating element j to the other emitting radiating elements when they do not emit RF energy. DR may be a value between 0 and 1, and thus may be represented by a percentage number.

Accordingly, the absorbability indicator, DR, corresponding to one emitting radiating element in a system that has three emitting radiating elements may be calculated based on reflection and transmission coefficients (a/k/a S parameters), according to equation (6):

$$DR_1 = 1 - (|S_{11}|^2 + |S_{12}|^2 + |S_{13}|^2). \quad (6)$$

As shown in equation (6), DR may be different at different radiating elements. Thus, in some embodiments, amount of energy supplied to a particular radiating element may be determined based on the AI associated with that particular radiating element.

In some embodiments, a reflection coefficient $\Gamma$ may be used as a value indicative of energy absorbable by the object. This AI may be defined as $$\Gamma = \frac{\sum S - \sum R}{\sum S}$$

where $\Sigma S$ represents the sum of all amounts of energy (or power) supplied to emitting radiating elements, and $\Sigma R$ represents the sum of all amounts of energy (or power) received by the emitting radiating elements. The reflection coefficient $\Gamma$ may be used when more than one emitting radiating element emit RF energy simultaneously.

In some embodiments, DR calculated for an MSE may be time dependent. Electromagnetic feedback received at that MSE may be monitored at different occasions during the RF energy application and DR (or any other parameter used for determining amounts of energy to be supplied) may be calculated at each occasion. Thus equations (5) and (6) may take the form:

$$DR(t) = (P_S(t) - P_R(t) - P_C(t))/P_S(t) = 1 - (|S_{11}(t)|^2 + |S_{12}(t)|^2 + |S_{13}(t)|^2) \quad (7)$$

In some embodiments a time average of DR may be calculated for each MSE.

In certain embodiments controller 150 may be configured to determine an RF energy application protocol by adjusting the amount of RF energy supplied at each MSE based on EM feedback. EM feedback may be received from energy application zone 102, e.g., during sweeping over a plurality of MSEs. Additionally or alternatively, feedback-related values may be calculated. For example, according to some embodiments, controller 150 may be configured to determine the amount of energy to be supplied at each MSE based on feedback received at the respective MSE. The way by which the amount of energy is determined based on the feedback may be termed energy application protocol. In some embodiments, an energy application protocol may dictate that amounts of energy applied at some MSEs may be inversely related to the AI calculated for the respective MSEs. Additionally or alternatively, an energy application protocol may dictate that amounts of energy applied at an MSE would be of inverse relationship with other EM feedback-related values. EM feedback related values may be any value of EM feedback that was received during the application of RF energy at a particular MSE, thus any EM feedback related value may be associated with a particular MSE. Additionally or alternatively, an energy application protocol may include determining the amount of energy applied at an MSE according to other relationships, for example, linear relationship, between energy applied and feedback-related values. For example, when the value indicative of absorbable energy in a particular MSE subset (i.e., one or more MSEs) tends to be relatively high (e.g., above a predetermined threshold or higher than the average AI value over a set of MSEs that includes the subset, etc.), the amount of energy determined by an energy application protocol to be applied at each MSE of that MSE subset may be relatively low (e.g., lower than the amounts of energy applied at any MSE associated with AI values below the predetermined threshold). Additionally or alternatively, when an indicator of absorbable energy in a particular MSE subset tends to be relatively low (e.g., below a predetermined threshold or below the average AI value over a set of MSEs that includes the subset, etc.), the supplied energy may be relatively high (e.g., higher than the amounts of energy applied at any MSE associated with AI values above the predetermined threshold). According to some energy application protocols, there is a substantially inverse relationship between the amounts of energy applied at different MSEs and the AI values calculated for the same MSEs. If the energy applied according to such protocols at each MSE is plotted against the AI value calculated for the MSE at which energy is applied, the resulting line is decreasing. In some embodiments, the decreasing line may have a constant slope. In other embodiments, the slope of the decreasing function may vary. In some embodiments, the slope may vary such that a multiplicative product of the AI value and amount of energy remains substantially constant.

This substantially inverse relationship may be even more closely correlated. For example, the supplied (applied) energy may be set such that its product with the absorbable energy value (i.e., the absorbable energy by object 103) is substantially constant across the MSEs applied. In other embodiments, other relations may be applied, for example a constant amount of energy may be applied in at least a sub-group of MSEs.

According to some embodiments, electromagnetic feedback may include the complex input impedance of a radiating element, denoted herein as Zin, its real part, denoted Real (Zin), or its imaginary part, denoted Img(Zin). The controller may receive EM feedback signals associate with Real(Zin) and Img(Zin) values measured at each of the emitting radiating elements, at each of a plurality of MSEs during sweeping over the plurality of MSEs. The controller may associate the measured Real(Zin) and Img(Zin) values with the respective MSE. The controller (e.g., controller 150) may further be configured to control the RF energy application at each MSE based on the measured Real(Zin) and/or Img(Zin). For example, the resonance nature of an EM field excited in the energy application zone at a particular MSE from a plurality of MSEs may be determined based on the value of Img(Zin) at that particular MSE. For example, in some embodiments, the resonance character may be different at MSEs for which Img(Zin) is 0 from MSEs for which Img(Zin) is not zero.

The controller may then be configured to apply RF energy at different amounts at different MSEs based on their resonant characters.

Some exemplary energy application protocols may lead to more spatially uniform energy absorption in the object than others. As used herein, spatial uniformity may refer to a condition where the absorbed energy across the object or a portion (e.g., a selected portion) of the object that is targeted for energy application is substantially constant (for example per volume unit or per mass unit). In some embodiments, the energy absorption is considered substantially constant if the variation of the dissipated energy at different locations of the object is lower than a threshold value. For instance, variation of the energy dissipation across the object may be calculated based on the distribution of the dissipated energy in the object, and the absorbable energy may be considered substantially constant if the variation in the absorbed energy in different portions of the object is less than 50%. Because in many cases spatially uniform energy absorption may result in spatially uniform temperature increase, consistent with the presently disclosed embodiments, spatial uniformity may also refer to a condition where the temperature increase across the object or a portion of the object that is targeted for energy application is substantially constant. The temperature increase may be measured by a sensing device, for example a temperature sensor provided in zone 102. In some embodiments, spatial uniformity may be defined as a condition, where a given property of the object is uniform or substantially uniform after processing, e.g., after a heating process. Examples of such properties may include temperature, readiness degree (e.g., of food cooked by the RF energy application), mean particle size (e.g., in a sintering process), etc.

In order to achieve control over the energy absorption in an object or a portion of an object, controller 150 may be configured to hold substantially constant the amount of time at which energy is supplied to radiating element 110 at each MSE, while varying the amount of power supplied at each MSE as a function of the absorbable energy value. In some embodiments, controller 150 may be configured to cause the energy to be supplied to element 110 at a particular MSE or MSEs at a power level substantially equal to a maximum power level of the device and/or the amplifier at the respective MSE(s). Alternatively or additionally, controller 150 may be configured to vary the period of time during which energy is applied to each MSE as a function of the absorbable energy value. In some embodiments, both the time duration and power at which each MSE is applied are varied as a function of the absorbable energy value. Varying the power and/or time duration of energy supplied at each MSE may be used to cause substantially uniform energy absorption in the object or to have a controlled spatial pattern of energy absorption, for example, based on feedback from the dissipation properties of the object at each applied MSE, wherein the term applied MSE refers to an amount of RF energy applied at that MSE. Consistent with some embodiments, controller 150 may be configured to control RF source 112 to supply different amount of RF energy at different MSEs based on a rule. In some embodiments, the rule by which RF energy amounts are determined may be different for different MSEs. For example, at a first range of the feedback-related values a first rule may be applied and at a second range a second rule may be applied, etc.

Because absorbable energy can change based on a host of factors including object temperature, in some embodiments, it may be beneficial to regularly update absorbable energy values and adjust energy application based on the updated absorbable values. These updates can occur multiple times a second, or can occur every few seconds or longer, depending on the requirements of a particular application.

In accordance with some embodiments, the at least one controller may be configured to determine a desired and/or target energy absorption level at each of a plurality of MSEs and adjust energy supplied to the radiating elements at each MSE in order to obtain the target energy absorption level at each MSE. The determination may be done based on the value indicative of energy absorbable in the object. For example, controller 150 may be configured to target a desired energy absorption level at each MSE in order to achieve or approximate substantially uniform energy absorption across a range of MSEs.

Controller 150 may be further configured to control the RF energy application by controlling various aspects of the RF energy source (e.g., source 112). In accordance with some embodiments, controller 150 may regulate modulations performed by modulator 115. In some embodiments, modulator 115 may include at least one of a phase modulator, a frequency modulator, and an amplitude modulator configured to modify the phase, frequency, and amplitude of an AC waveform generated by power supply 113 connected to the modulator.

In some embodiments, apparatus 100 may include a phase modulator (not illustrated) that may be controlled to perform a predetermined sequence of time delays on an AC waveform, such that the phase of the AC waveform is increased by a number of degrees (e.g., 10 degrees) for each of a series of time periods. In some embodiments, controller 150 may dynamically and/or adaptively regulate modulation based on feedback (e.g., EM feedback—for example, AI) from the energy application zone. For example, controller 150 may be configured to receive an analog or digital feedback signal from detector 118, indicating an amount of RF energy received from zone 102, and controller 150 may dynamically determine a time delay at the phase modulator for the next time period based on the received feedback signal.

In some embodiments, apparatus 100 may include a frequency modulator (not illustrated). The frequency modulator may include a semiconductor oscillator configured to generate an AC waveform oscillating at a predetermined frequency. The predetermined frequency may be in association with an input voltage, current, and/or other signal (e.g., analog or digital signals). For example, a voltage controlled oscillator may be configured to generate waveforms at frequencies proportional to the input voltage.

Controller 150 may be configured to regulate an oscillator (not illustrated) to sequentially generate AC waveforms oscillating at various frequencies within one or more predetermined frequency bands. In some embodiments, a predetermined frequency band may include a working frequency band, and the controller may be configured to cause the application of energy at frequencies within a sub-portion of the working frequency band. A working frequency band may be a collection of frequencies selected because, in the aggregate, they achieve a desired goal, and there is diminished need to use other frequencies in the band if that sub-portion achieves the goal. Once a working frequency band (or subset or sub-portion thereof) is identified, the controller may sequentially apply power at each frequency in the working frequency band (or subset or sub-portion thereof). This sequential process may be referred to as frequency sweeping. In some embodiments, based on the feedback signal provided by detector 118, controller 150 may be configured to select one or more frequencies from a frequency band, and regulate an oscillator to sequentially generate AC waveforms at these selected frequencies.

Alternatively or additionally, controller 150 may be further configured to regulate amplifier 116 to adjust amounts of energy delivered via radiating elements (e.g., element 110) based on the feedback signal. Consistent with some embodiments, detector 118 may detect an amount of energy reflected from the energy application zone and/or energy coupled at a particular frequency, and controller 150 may be configured to cause the amount of energy application at that frequency to be low when the reflected energy and/or coupled energy is low.

Additionally or alternatively, controller 150 may be configured to cause one or more radiating elements to apply energy at a particular frequency over a short duration when the reflected energy is low at that frequency.

In some embodiments, the apparatus may include more than one source of RF energy. For example, more than one oscillator may be used for generating AC waveforms of differing frequencies. The separately generated AC waveforms may be amplified by one or more amplifiers. Accordingly, at any given time, radiating elements may be caused to simultaneously emit RF waves at, for example, two or more differing frequencies to zone 102.

Controller 150 may be configured to regulate the phase modulator in order to alter a phase difference between two RF waves supplied to the energy application zone. In some embodiments, the source of RF energy may be configured to supply RF energy at a plurality of phases, and the controller may be configured to cause the application of energy at a subset of the plurality of phases. By way of example, the phase modulator may include a phase shifter. The phase shifter may be configured to cause a time delay in the AC waveform in a controllable manner within zone 102, delaying the phase of an AC waveform anywhere from between 0-360 degrees.

In some embodiments, a splitter (not illustrated) may be provided in apparatus 100 to split an AC signal, for example generated by an oscillator, into two AC signals (e.g., split signals). Controller 150 may be configured to regulate a phase shifter to sequentially cause various time delays such that the phase difference between two split signals may vary over time. This sequential process may be referred to as phase sweeping. Similar to the frequency sweeping described above, phase sweeping may involve a working subset of phases selected to achieve a desired energy application goal.

The controller may be configured to regulate an amplitude modulator in order to alter amplitude of at least one RF wave supplied to the radiating element(s). In some embodiments, the source of RF energy may be configured to supply RF energy at a plurality of amplitudes, and the controller may be configured to cause the application of energy at a subset of the plurality of amplitudes. In some embodiments, the apparatus may be configured to supply RF energy through a plurality of radiating elements, and the controller may be configured to supply energy with differing amplitudes simultaneously to at least two radiating elements.

In some embodiments, apparatus 100 may include an interface 160 (for example, as illustrated in FIG. 1B). Controller 150 may be configured to receive from interface 160 one or more processing instructions and/or other information related to the object. Interface 160 may include any user interface, e.g., a GUI, a touch screen, a key pad, a screen associated with a mouse, etc. Additionally or alternatively, interface 160 may include a device capable of reading and receiving information from a machine readable element, for example a barcode reader, an RFID reader, etc. Controller 150 may be configured to determine the energy application protocol solely based on the information received from interface 160 or in combination with the EM feedback received or calculated from a signal detected by at least one detector (e.g. detectors 118, 118a, and 118b) and/or at least one sensor (e.g., sensor 140). Additionally or alternatively, controller 150 may be configured to determine the energy application protocol solely based on user instruction received from interface 160, e.g., a user may instruct processing information through a GUI.

Some aspects of the invention may be related to application of RF energy to an energy application zone located at least partially inside a cavity. A cavity may be any void comprising at least one wall made from a material substantially opaque to RF energy. More than one wall or all the walls of a cavity may be made from materials opaque to RF energy. For example, an oven constructed from stainless steel, or Al(Si) alloys or other metals and alloys suitable for constructing a cavity. Alternatively, the at least one wall may comprise a dielectric material at least partially transparent to RF energy and coated by a coating made from material opaque to RF energy. A material substantially opaque to RF energy may be any material capable of blocking or reflecting RF energy above a predetermined threshold (e.g., above 90%).

FIG. 2 illustrates an exemplary cavity 200 in accordance with some embodiments. Cavity 200 may be the energy application zone (102) shown in FIGS. 1A-1C, and thus may be part of apparatus 10, 20, or 100. Cavity 200 may include cavity body 202. Cavity body 202 may be configured to hold at least a portion of an object (e.g., object 103). Cavity body 202 may comprise at least one wall constructed from or coated by, a material substantially opaque to RF energy. Cavity body 202 may have a rectangular shape (as illustrated), cylindrical shape, or may have any other suitable shapes. For example, cavity 200 may take a shape of a cooking oven for cooking food, a cylindrical tank for processing liquids, an industrial furnace for curing polymers or sintering parts, a pipe comprising a flowing fluids or gasses, etc. Cavity 200 may further comprise at least one radiating element: 204a, 204b, and 204c. Radiating elements 204a, 204b, and 204c may be any elements configured to emit and/or receive RF energy from the cavity. The radiating elements may be connected to an RF source (e.g., source 112 in FIG. 1B) and to a controller (e.g., controller 150 in FIG. 1B). Radiating elements may be installed in proximity to at least one cavity wall (for example, element 204a). Radiating element may be installed outside the cavity (for example, element 204b), in proximity to a cavity wall having an RF transparent window 205. RF transparent window 205 may be constructed from any dielectric material capable of transferring at least a portion of the RF energy emitted from element 204b to cavity 200. Radiating element may be located in proximity to or at least partially inside object 103 (for example, element 204c). For example, element 204c may be immersed in a solution in a chemical reactor or a beer in a brewery tank, element 204c may also be embedded in a filter or a catalytic convertor in order to heat the filter or the convertor. In some embodiments, cavity 200 may include at least one sensor, such as sensors 206 and 208. Sensor 206 may be embedded in, immersed in or placed in proximity to object 103. Sensor 206 may be any sensor configured to measure a property of object 103. The property may include a measurable property, such as temperature, pressure, volume, pH, humidity ratio, density, moisture, etc. Additionally or alternatively, the property may include other characteristics, such as color, taste, doneness, smell, etc. In some embodiments, one or more properties may be monitored (e.g., detected) by sensor 206. In some embodiments, sensor 206 may be configured to measure EM feedback detected in cavity 200. For example, sensor 206 may be configured to measure the intensity of the EM field excited in cavity 200 by the radiating element(s). In some embodiments, sensor 208 may be installed in proximity or on at least one wall in cavity 200. Sensor 208 may be any sensor configured to measure a property of object 103 or cavity 200. Similar to sensor 206, sensor 208 may sense one or more property of object 103 and/or the surrounding of the object. In some embodiments, sensors 206 and 208 sense the same properties. In some embodiments, sensors 206 and 208 may sense different properties, for example, sensor 206 may sense the temperature of the object and sensor 208 may sense humidity in cavity 200, in the vicinity of object 103.

Figure 3A:
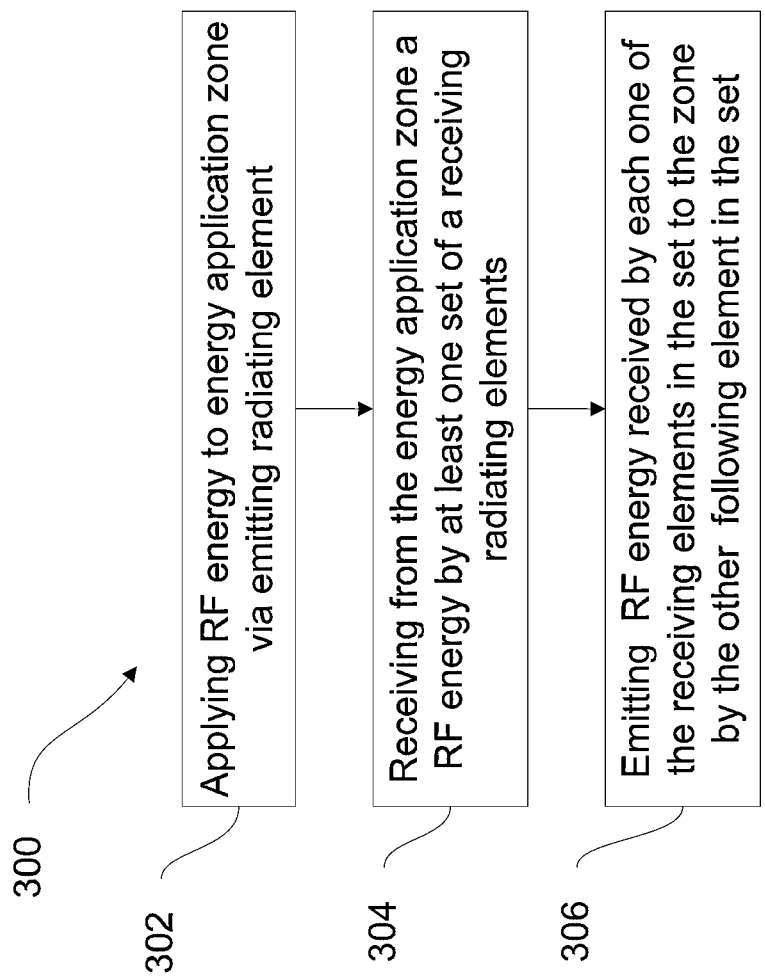
FIGS. 3A and 3B are flowcharts of two exemplary methods for applying RF energy to an energy application zone, in accordance with some embodiments of the invention.

Reference is now made to FIG. 3A, which is a flowchart of exemplary method 300 for applying RF energy to an energy application zone (e.g., for processing an object placed in the energy application zone) in accordance with some embodiments. The method may include placing an object to be heated in the energy application zone. In step 302, RF energy may be applied to an energy application zone (e.g., zone 102 or cavity 200) in order to process an object placed in the energy application zone. In some embodiments, RF energy application may be initiated after the object is placed. RF energy may be emitted from at least one emitting radiating element (e.g., radiating element 110, radiating elements 204a-204c, radiating element 53). Emitting radiating element(s) may be any radiating element configured to emit, to the energy application zone, RF energy supplied to the emitting radiating element from an RF source (e.g., source 112) at one or more MSEs through, for example, a transmission line. In some embodiments, a controller (e.g., controller 150) may be configured to control the RF energy application at one or more MSEs via the emitting radiating elements. For example, the controller may select a predetermined sub-set of MSEs from a plurality of MSEs among the MSEs available for the apparatus including cavity 200, e.g., apparatus 10, 20, or 100. Additionally, the controller may select an amount of RF energy to be supplied to the radiating element(s) at each of the selected MSEs (e.g., by controlling the power level supplied at each MSE and/or the transmission time along which power is supplied at each MSE). In some embodiments, the controller may be configured to control the RF energy application based on EM feedback received from the energy application zone or any calculation based thereon, as discussed above. In some embodiments, the controller may control the RF energy application based on an EM feedback received from one or more detectors (e.g., detector 118a) regarding energy transferred from one receiving radiating element (e.g., element 17a) to another receiving radiating element (e.g., element 17b). The EM feedback detected and received from detector 118a (or 118b) may be via cables, circulators, or other RF devices. For example, controller 150 may receive information relating to energy transferred from element 17b to element 17a and cause application of RF energy from emitting element 110 accordingly. In some embodiments, the controller may be configured to cause energy application only at MSEs at which energy transferred from element 17b to element 17a (or vice versa) is higher than a predetermined threshold. Alternatively, in some embodiments, the controller may be configured to cause energy application only at MSEs at which energy transferred from element 17b to element 17a (or vice versa) is lower than a predetermined threshold. Additionally or alternatively, the controller may control the RF energy application based on an EM feedback received from one or more detectors associated with emitting radiating elements (e.g., detector 118), or any calculation based thereon.

Other than relying on an EM feedback for determining the amounts of RF energy and/or the selected MSEs to be applied to the energy application zone, the amounts of RF energy and/or the selected MSEs may be determined based on computer simulation of the energy application zone, and/or RF energy application experiments performed in the energy application zone. The RF energy emitted to the energy application zone may be at least partially delivered to the energy application zone (i.e., at least some of the energy supplied to the emitting radiating element from the RF source may couple to other emitting radiating elements or absorbed in the object or in other absorbing bodies in the energy application zone, for example, trays, racks, etc.). A portion of the delivered RF energy may dissipate in the object, and a portion may couple to receiving radiating elements located in the energy application zone.

In step 304, the coupled energy may be received by one or more sets of receiving elements (e.g., pairs 17 and 27). Each set of receiving radiating elements may be circularly interconnected.

In step 306, the RF energy received by one radiating element (e.g., 17a) of the set may be emitted back to the energy application zone by the following radiating element (e.g., element 17b) of the set and vice versa. Each of the sets of the receiving elements may be circularly interconnected, e.g., using a set of circulators (e.g., circulators 18a and 18b). In some embodiments, part of the RF energy emitted back to the energy application zone may be absorbed by the object and another part may be received again at one or more receiving radiating elements of the set, and then emitted back to the energy application zone by the next radiating element in the set. A third part may be received by one or more emitting radiating elements. In some embodiments, this process may repeat itself until substantially all of the RF energy supplied to the radiating element is absorbed by the object. It should be noted, that in some embodiments, this repeated process cannot be identified step by step, and may serve as a conceptual illustration of the actual findings, which may indicate some final values of voltages, currents, impedances, or network parameters, measured at different parts of the apparatus.

Figure 3B:
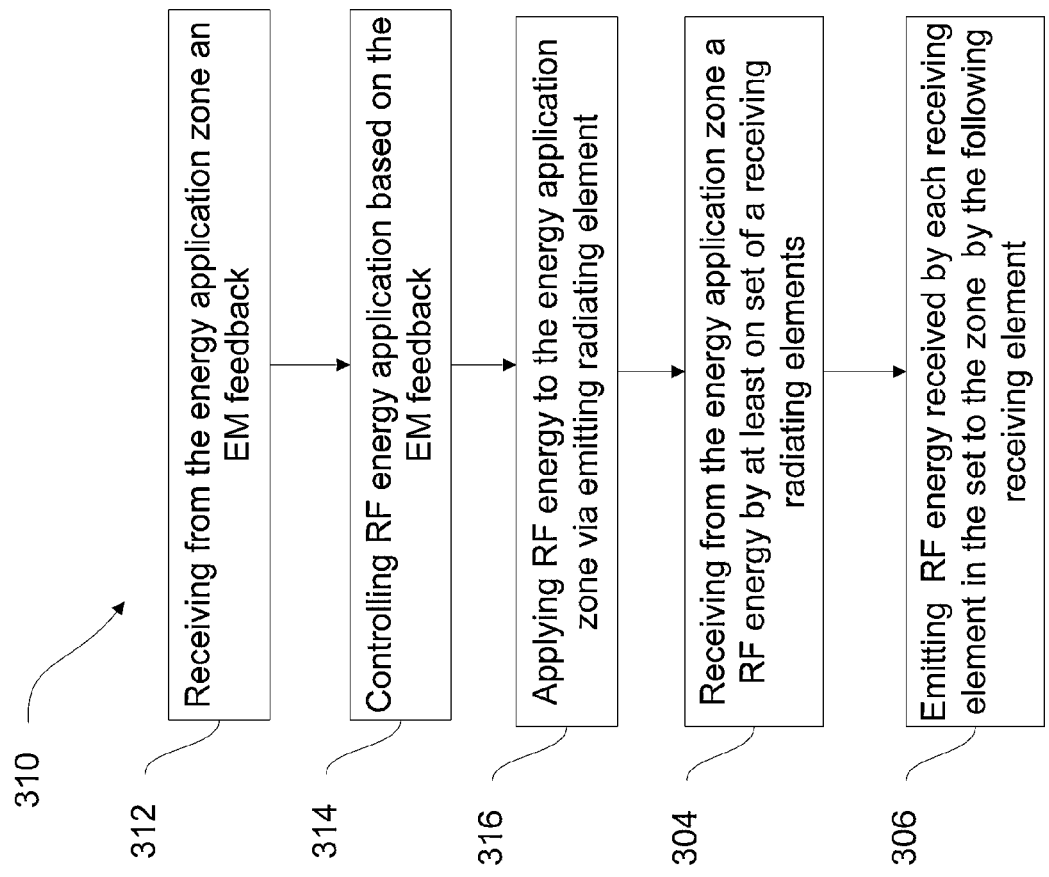

In some embodiments, RF energy application to the energy application zone may be controlled according to EM feedback received from the energy application zone. Flowchart 310 in FIG. 3B shows an exemplary method for applying RF energy to an energy application zone based on EM feedback received from the energy application zone (e.g., zone 102 or cavity 200). In step 312, EM feedback may be received from the energy application zone. An initial amount of RF energy may be applied by sweeping over a plurality of MSEs and the EM feedback related values associated with each MSE may be received. The EM feedback may include any EM feedback received from the energy application zone via a detector or a sensor or calculated based on a signal received via a detector (e.g., detectors 118, 118a, or 118b) or a sensor (e.g., sensor 140, 206, or 208). Examples of EM feedback may include: the intensity of the EM field excited at some predetermined locations in the energy application zone (e.g., in proximity to the object), the supplied, reflected, and/or coupled energy or power detected on each radiating element (whether emitting or receiving elements), the S parameters detected on each of the radiating elements, the $\Gamma$ reflection coefficient, the dissipation ratio detected at each of the emitting radiating elements, the mean dissipation ratio detected at each of the emitting radiating elements, the input impedance of one or more radiating elements, or any other value indicative of energy absorbable in the object. The EM feedback may be detected at one or more MSEs and may be calculated for each MSE (e.g., dissipation ratio as function of MSE, for example—dissipation ratio as a function of the frequencies in which EM energy is applied).

In step 314, RF energy application to the energy application zone may be controlled based on the EM feedback. A controller (e.g., controller 150) may be configured to control the RF energy application via at least one emitting radiating element (e.g., element 110), for example—the controller may determine amount(s) of energy to be applied according to one or more energy application protocols, e.g., one or more of the protocols described above. In step 316, RF energy may be applied to the energy application zone, via at least one emitting radiating element, e.g., in accordance with the determined energy application protocol(s). An emitting radiating element (e.g., elements 110 or elements 204a-204c) may include any radiating element configured to emit RF energy supplied to the element from the RF source to the energy application zone at one or more MSEs.

RF energy applied in step 316, may be at least partially coupled to one or more sets of receiving radiating elements (e.g., pairs 17 and 27), in step 304. RF energy received at each one of the receiving radiating elements may be emitted back to the energy application zone by the following received element, in step 306. Steps 304 and 306 may be similar to steps 304 and 306 disclosed in method 300 and may be carried out in the same manner.

FIG. 4 illustrates a flowchart of an exemplary method 400 for making or manufacturing an apparatus for applying RF energy to an energy application zone, according to some embodiments of the invention. Energy application zone comprising one or more emitting radiating elements may be obtained in step 402. The energy application zone may be a cavity—for example: a cooking chamber of an oven. In some embodiments, the energy application zone may be obtained such that one or more radiating elements are already installed in the zone and connected to the one or more RF sources. Alternatively, one or more radiating elements configured to emit RF energy to the energy application zone may be installed in the energy application zone, and connected to one or more RF sources (e.g., source 112). In some embodiments, the energy application zone may be obtained with only the radiating elements or the source, and the missing elements or sources may be installed after obtaining the energy application zone. Alternatively, the energy application zone may be obtained without any radiating elements or sources and both may be installed after obtaining the energy application zone. Obtaining energy application zone according to step 402, may include obtaining a zone that comprises one or more radiating elements connected to an RF source or obtaining energy application zone without the radiating element and/or the RF source and installing the missing component(s) in the zone. For example, a microwave cooking oven may include at least one antenna and/or at least one waveguide. In some embodiments, the energy application zone may include other heating elements, for example, IR elements, hot air impingement, gas or electric stove, etc.

In step 404, one or more sets of receiving elements may be obtained. The one or more sets (e.g., pair 17, pair 27 and/or the set illustrated in FIG. 5) may include identical or different receiving elements. The obtained set of receiving elements may include two radiating elements not interconnected to each other. Alternatively, the obtained set may include two or more radiating elements interconnected in a non-circular manner. Alternatively, the obtained set may include two or more receiving radiating elements circularly interconnected. The two or more radiating elements in the pair may be circularly interconnected via two circulators (e.g., circulators 18a and 18b or 28a and 28b), as illustrated in FIGS. 1A-1C. In some embodiments, voltage, current, or other parameters may be measured at the circular interconnection, for example, between circulators 28a and 28b, between a radiating element and a circulator, or at any other place where parameters relating to energy transfer between the circularly interconnected radiating elements may be obtained.

In step 406, the one or more sets of receiving radiating elements may be installed in the energy application zone. If the receiving radiating elements in the set are obtained circularly interconnected, further installation may be unnecessary. Alternatively, if the receiving radiating elements in the set are not circularly interconnected prior to installation in the energy application zone, installation may include circularly interconnecting the receiving elements. Circular interconnection within each set may take place either before or after the installation of the radiating elements in the energy application zone. Circularly interconnecting the two or more elements may include connecting and installing RF devices that establish the circular interconnection, for example, two or more circulators (e.g., circulators 18a and 18b or 28a and 28b), as illustrated in FIGS. 1A-1C. In some embodiments, additional detectors and/or sensors may be installed in the energy application zone and/or connected to the radiating elements (either emitting and/or receiving).

Figure 5:
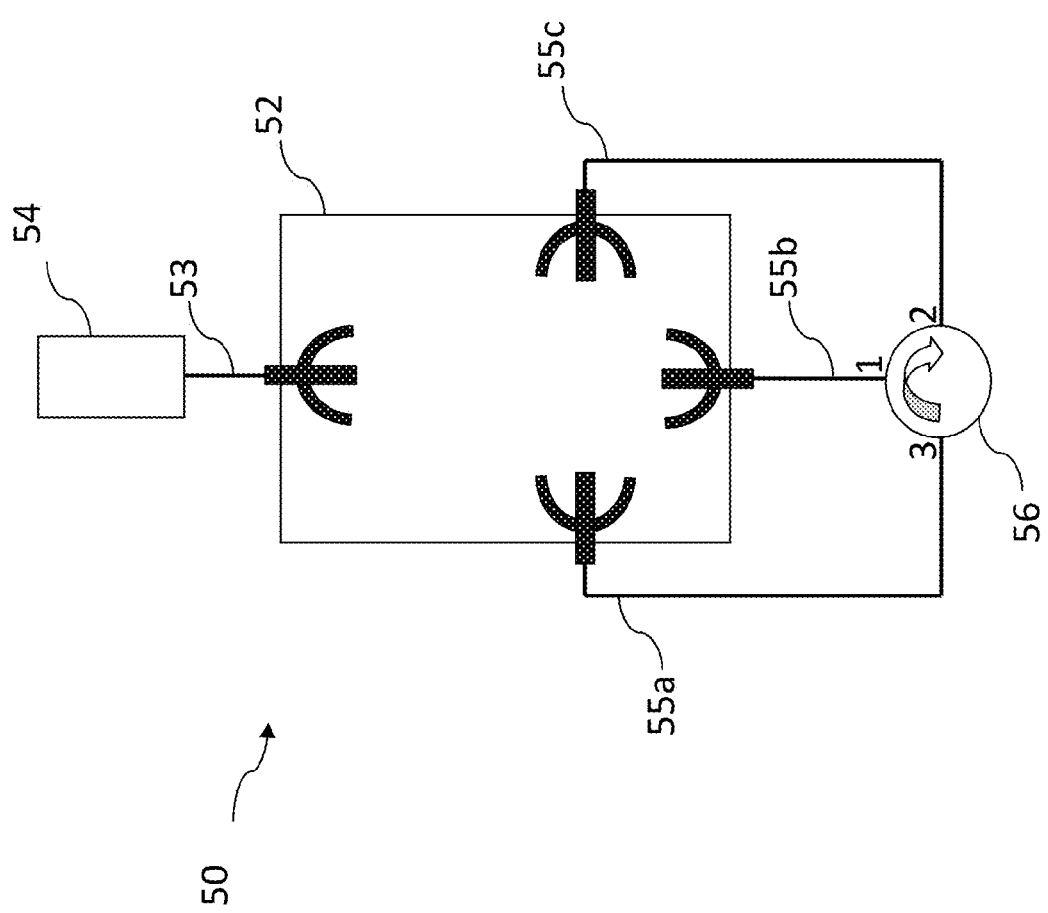
FIG. 5 is a diagrammatic representation of an apparatus for applying RF energy to an object, in accordance with some exemplary embodiments of the invention.

FIG. 5 is a diagrammatic representation of an apparatus 50 for applying RF energy to an object (not shown), in energy application zone 52, in accordance with some exemplary embodiments of the invention. The apparatus may include an emitting radiating element 53 configured to apply RF energy supplied to the emitting radiating element from a source 54 of RF energy to energy application zone 52. Apparatus 50 may further include a set of receiving radiating elements 55a, 55b, and 55c. The receiving radiating elements are circularly connected to each other via a three-port circulator 56.

For example, radiation received at radiating element 55b reaches the circulator at port 1, and continues to the energy application zone via port 2 of the circulator and radiating element 55c connected to port 2. Radiation received at radiating element 55c reaches the circulator at port 2, and continues to the energy application zone via port 3 of the circulator and radiating element 55a connected to port 3. Radiation received at radiating element 55a reaches the circulator at port 3, and continues to the energy application zone via port 1 of the circulator and radiating element 55b connected to port 1.

This way, a circular interconnection is formed between the radiating elements, because a sequence of radiating elements (b, c, a) may be identified, and energy received by one of the receiving radiating elements (e.g., 55b) from the energy application zone is emitted back to the energy application zone by the next radiating element in the sequence (e.g., 55c), and energy received by the last radiating element in the sequence (55a) from the energy application zone is emitted back to the energy application zone by the first radiating element in the sequence (element 55b). The same holds if the sequence begins with receiving radiating element 55a, in which case the sequence is 55a, 55b, 55c. Such a sequence may be referred to as circular, and the radiating elements may be said to be circularly interconnected.

As used herein, if a machine (e.g., a controller) is described as configured to perform a task (e.g., configured to cause application of a RF energy at certain MSEs), then it is to be understood that the machine includes the components or elements (e.g., parts, software, etc.) needed to make the machine capable of performing the described task during operation. In some embodiments, the machine may also perform the task during operation. Similarly, when a task is described as being done in order to establish a target result (e.g., in order to apply a RF energy at a plurality of MSEs to the object), the target result may be fully or partially accomplished through performing the task.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. An apparatus for applying RF energy to an energy application zone, the apparatus comprising:
    a set of receiving radiating elements, comprising at least first and second radiating elements sequentially interconnected such that energy received by one of the receiving radiating elements from the energy application zone is emitted back to the energy application zone by the next radiating element in the sequence and energy received by the last radiating element in the sequence from the energy application zone is emitted back to the energy application zone by the first radiating element in the sequence,
    wherein the radiating elements in the set of receiving radiating elements are interconnected via at least one circulator.

2. The apparatus of claim 1, wherein the set of receiving radiating elements is a pair of radiating elements.

3. The apparatus of claim 1, comprising two or more sets of receiving radiating elements.

4. The apparatus of claim 1, further comprising one or more emitting radiating elements, connected to an RF source to apply RF energy from the RF source to the energy application zone at one or more MSEs.

5. The apparatus of claim 4, further comprising a controller configured to control the RF energy application to the energy application zone via the one or more emitting radiating elements based on electromagnetic feedback received from the energy application zone through one or more of the emitting radiating elements.

6. The apparatus of claim 4, further comprising a controller configured to control the RF energy application to the energy application zone via the one or more emitting radiating elements based on electromagnetic feedback received from the energy application zone through one or more of the receiving radiating elements.

7. The apparatus of claim 5, wherein the controller is configured to control the RF energy application at the one or more MSEs based on EM feedback received from the energy application zone at each MSE.

8. The apparatus of claim 1, wherein the set of receiving radiating elements is connected to an RF source.

9. The apparatus of claim 1, wherein the set of receiving radiating elements includes between 3 and 6 radiating elements.

10. A method of using an apparatus according to claim 3, the method comprising:
    placing an object to be heated in the energy application zone; and
    initiating energy application through the one or more emitting radiating elements.

11. A method of making an apparatus for applying RF energy to an object in an energy application zone via one or more emitting radiating elements, the method comprising:
    obtaining at least two receiving radiating elements; and
    installing the at least two receiving radiating elements in the energy application zone, such that energy received from the energy application zone by one of the receiving radiating elements is emitted back to the energy application zone by the other receiving radiating element,
    wherein installing comprises connecting the at least two radiating elements through at least one circulator.

12. The method of claim 11, wherein obtaining comprises obtaining the at least two receiving radiating elements interconnected such that energy received from the energy application zone by one of the receiving radiating elements is emitted back to the energy application zone by the other receiving radiating element.

13. The method of claim 11, wherein installing comprises interconnecting the at least two receiving radiating elements such that energy received from the energy application zone by one of the receiving radiating elements is emitted back to the energy application zone by the other receiving radiating element.

14. A method for applying RF energy via at least one emitting radiating element to an energy application zone comprising a first and a second radiating elements, interconnected through a circulator such that energy received by the first radiating element from the energy application zone is emitted back to the energy application zone by the second radiating element and energy received by the second radiating element from the energy application zone is emitted back to the energy application zone by the first radiating element, the method comprising:
    receiving feedback from the energy application zone; and
    controlling RF energy application to the zone via the at least one emitting radiating element based on the received feedback,
    wherein the feedback includes EM feedback regarding energy transferred from the first radiating element to the second radiating element.

* * * * *